March 16, 1965 A. J. KAYE 3,173,555
MECHANISM FOR REMOTE MANIPULATION OF INDUSTRIAL OBJECTS
Filed Sept. 7, 1962 6 Sheets-Sheet 1

Inventor
Anthony J. Kaye
by Cumpston & Shaw
His Attorneys

Inventor
Anthony J. Kaye
by Cumpston + Shaw
His Attorneys

Fig. 17.

Inventor
Anthony J. Kaye
by Cumpston & Shaw
His Attorneys

United States Patent Office 3,173,555
Patented Mar. 16, 1965

3,173,555
MECHANISM FOR REMOTE MANIPULATION OF
INDUSTRIAL OBJECTS
Anthony J. Kaye, Schenectady, N.Y., assignor, by mesne
assignments, to American Machine & Foundry Company, New York, N.Y., a corporation of New Jersey
Filed Sept. 7, 1962, Ser. No. 222,112
12 Claims. (Cl. 214—1)

This invention relates generally to mechanism for positioning or otherwise manipulating objects, tools and the like in industrial operations, including programmed industrial manipulators. In a preferred form, it comprises mechanism affording duplication of the human arm's manipulative skill in placing physical objects in an infinite number of attitudes and positions in a three dimensional space and operated and controlled by memory or program devices with which the desired movements of the mechanism may be recorded and then subsequently employed to cause the mechanism to repeat the record movements.

Mechanisms have been devised in the past which simulate certain movements of the human arm and hand, commonly known as remotely controlled handling equipment, programmed manipulators and the like, operating to duplicate the manipulative skill of the human arm in its ability to grasp, rotate, locate, and otherwise manipulate objects and to do this under the constant control of a remotely located person or suitably designed mechanical, electrical or similar memory or programming medium.

It is an object of this invention to apply a new principle to such art of manipulating objects in space, namely the use of one or more mechanical members acting as tension or compression vectors to guide or restrain the lateral movements of an object carrying member, thus enabling the latter member to position an object in space.

Another object is ot embody this new principle in a flexible member or arm, guided and restrained by one or more adjustable such vector members, or "tendons," to precisely move one end of the flexible member and an object carried thereby from point to point in space limited only by the size and range of the equipment.

It is a further object of this invention to apply this new principle to a flexible arm which carries a gripping hand and for which a plurality of hand types are provided with the gripping hands being readily interchangeable.

Another object is the provision of such a mechanism operated by a single motor unit for achieving three dimensional positioning, as in the assembly of the multiple parts of a product.

Another object is to provide an object handling unit employing this new principle and including mechanisms by which the desired movements of the equipment can be retained and through which the equipment can subsequently automatically, accurately and continually repeat the desired movements.

Other objects and advantages will become more apparent in the following specification and claims taken in connection with the accompanying drawings which describe and illustrate certain embodiments of the invention.

Figures 1, 4, 16:
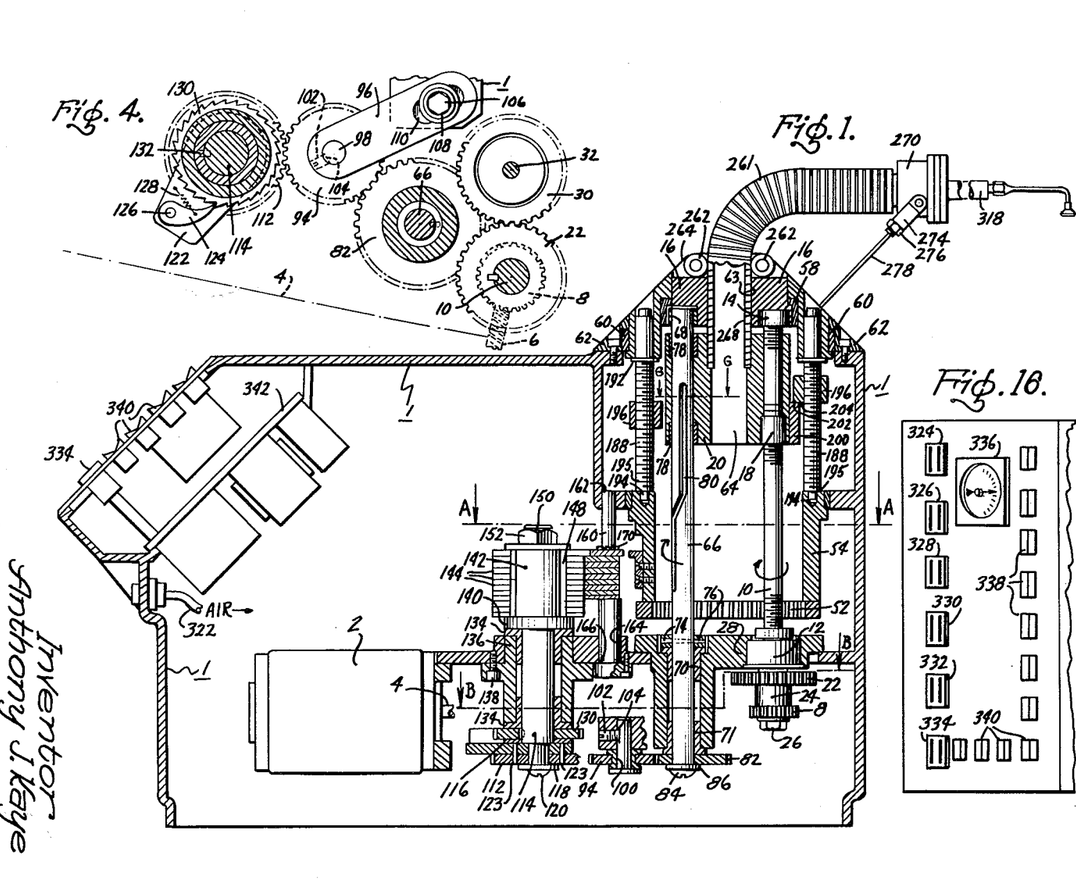
FIG. 1 is a central sectional elevation of a mechanism embodying the invention.
FIG. 4 is an enlarged sectional view along the line B—B of FIG. 1.
FIG. 16 is an enlarged plan view of the electrical control panel shown sectionally in FIG. 1.
Figure 2:
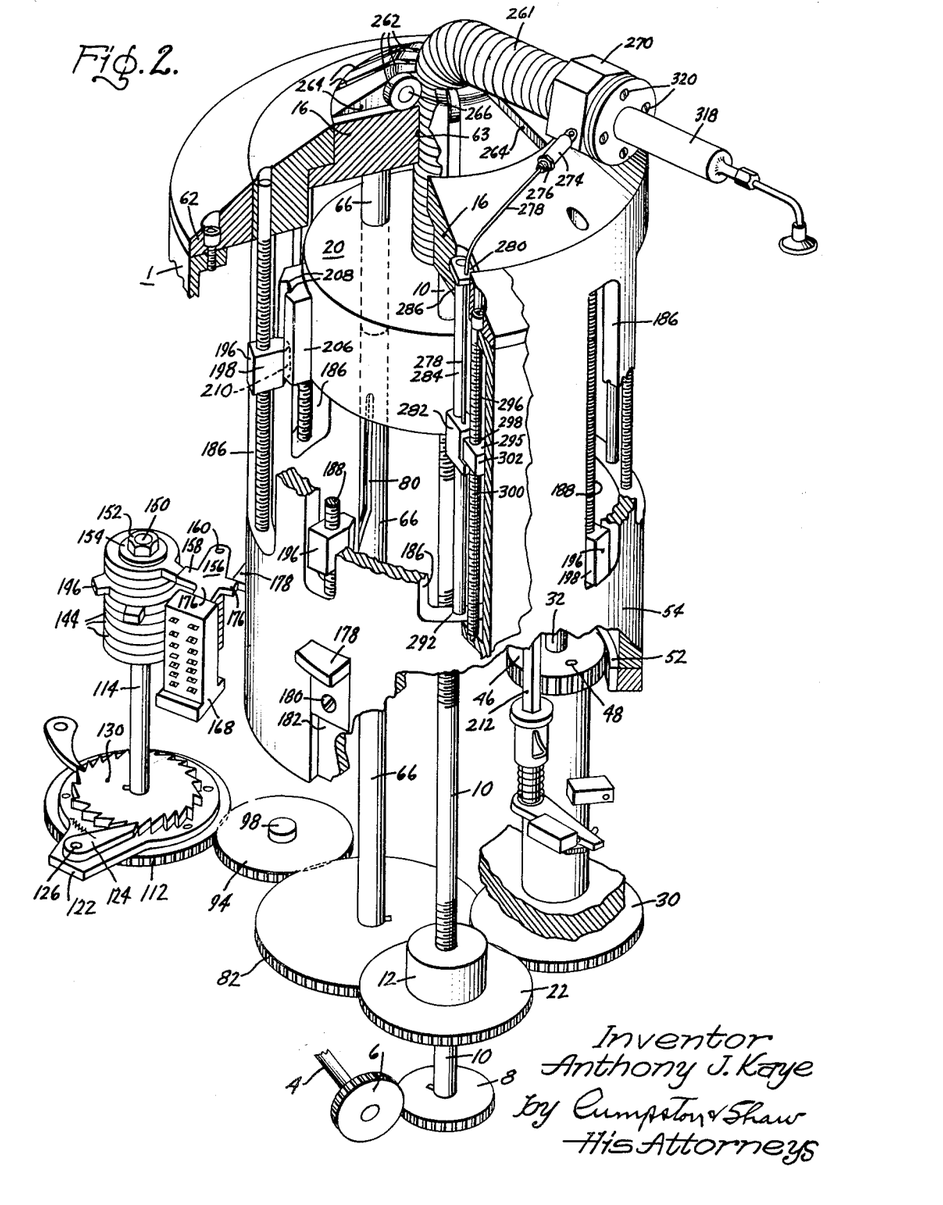
FIG. 2 is an enlarged perspective view of a portion of the embodiment shown in FIG. 1, partly in section and partly broken away.

Referring to FIGS. 1 and 2 of the drawings, an electric motor 2 (FIG. 1) mounted on the main housing 1, rotates a suitable shaft 4 (FIG. 2) and provides the motive power for the unit. Shaft 4 is supported by a bearing and coupling (not shown) and has a helical spur gear 6 suitably affixed thereon. Gear 6 engages and drives a second gear 8 fixed to a vertical lead screw shaft 10 by means of a threaded nut 26 (FIG. 1). The shaft 10 is supported by a suitable bearing 12 located in a suitable support 28 fixably mounted on the main-housing 1. Shaft 10 is additionally supported at its upper end by a bearing 14 located in a guide housing 16.

Figure 6:
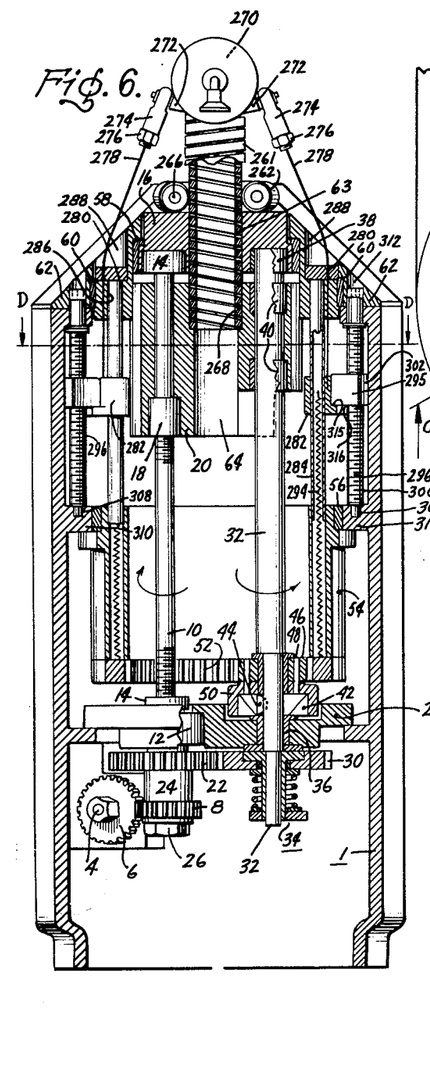
FIG. 6 is a sectional view along the line C—C of FIG. 5.

Shaft 10 is a threaded or lead screw shaft of suitable design and in the embodiment illustrated is of efficient ball screw design in which the rotary motion of the lead screw is converted to linear motion of a ball nut 18 through a circulating train of balls (not shown) retained in the nut and in a suitably designed helical groove in the shaft 10 as well understood in the art. The ball nut 18 is suitably attached to a main carriage 20 so that the linear motion imparted to the ball nut 18 by the shaft 10 is also imparted to the main carriage 20. A second spur gear 22, keyed on shaft 10 (FIG. 4) is axially displaced from gear 6 by means of a suitable spacer 24 (FIG. 1). Gear 22 engages a similar spur gear 30 (FIG. 2) which is allowed to revolve about a vertical shaft 32 but which is driven by an adjustable spring loaded, friction clutch mechanism 34 (FIG. 6) fixed to shaft 32 (FIG. 6). Shaft 32 is parallel to shaft 10 and supported and freely rotatable in a suitable bearing 36 located in the retainer 28. Shaft 32 is additionally supported at its upper end by a suitable bearing 38 located in the guide housing 16. Additional bearings 40, fixably mounted in the main carriage 20, allow shaft 32 to act as a carriage guide as the carriage is moved vertically, the bearings being of suitable design to allow the carriage to slide axially on shaft 32 even while the shaft is rotating. The rotor 42 of a suitable one direction clutch mechanism is also mounted on shaft 32 and suitably driven by the shaft through a key 44 or spline. The outer housing 50 (FIG. 6) of the one direction clutch 34 is attached to a planetary spur gear 46 by means of drive pins 48 such that the gear 46 is co-axial to shaft 32. In this manner, rotary motion is imparted to gear 46 only when shaft 32 rotates in one direction, represented as counter-clockwise when viewed as in FIG. 4 in the present embodiment, and no motion is imparted to the gear 46 when shaft 32 rotates in the other direction, clockwise, as a result of the rotor 42 of the direction clutch and its outer housing 50.

FIGS. 2 and 6 illustrate the relationship of planetary spur gear 46 as it is engaged with an internal ring gear 52 which is suitably fixed on a stop drum 54 whose axis of rotation is vertical and parallel, but not co-incident with the axes of rotation of shaft 10 and shaft 32. The stop drum is free to rotate about this vertical axis (FIG. 6) and is supported by a suitable bearing 56 located on the main housing 1, bearing 58 located on the guide housing 16 and bearing 60 located on the tendon adjustment ring 62 (FIG. 6) mounted on the main housing.

The guide housing 16 (FIG. 1) is so located that the axis of a vertical bore 63 through its center is co-axial with the vertical axis of rotation of the stop drum 54 and co-incident with the axis of a bored hole 64 in the main carriage 20. The guide housing itself, unlike the drum, is not free to rotate, being fixably oriented with respect to the main housing 1.

FIGS. 1 and 2 illustrate the location of the index drive shaft 66, whose axis of rotation is parallel, but not co-incident with the axes of rotation of shaft 10, shaft 32 and stop drum 54. The upper end of the index drive shaft 66 (FIG. 1) is supported by a suitable bearing 68 in the guide housing 16. The lower end of shaft 66 is supported in suitable bearings 70 and 72 mounted in the retainer 28 fixedly attached to the main housing 1. Axial location of shaft 66 is assured by means of a thrust bearing 74 attached to the shaft by a shear pin 76. Additional bearings 78, fixed in the main carriage 20, allow shaft 66 to act as a carriage guide during the vertical movement of the carriage, the bearings being of suitable design to allow the carriage to slide axially on shaft 66 even as the shaft is rotating. Shaft 66 contains an axially extending cam slot 80 which, in conjunction with other mechanisms hereafter described, cause the shaft to rotate about its own axis, thus imparting rotation to the spur gear 82 fixed to the lower end of shaft 66 and co-axial with it by suitable means such as a machine screw 84 and thrust washer 86.

Figure 8:
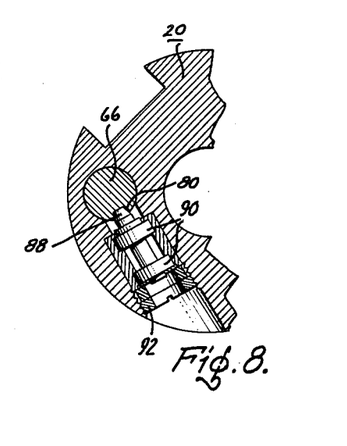
FIG. 8 is an enlarged sectional view along the line G—G of FIG. 1.

FIG. 8 illustrates the mechanism for rotating shaft 66. A conical cam follower 88 is mounted in the main carriage 20 so that its axis of rotation is perpendicular to index shaft 66 and its conical end engages the cam slot 80 in the shaft. The cam follower 88 is mounted in suitable bearings 90 so that it is free to rotate about its own axis but is prevented from axial motion by a suitable (threaded) bearing retainer 92. The vertical motion of the main carriage 20 is then converted to rotary motion of index shaft 66 as the cam follower 88 follows the cam slot configuration.

Referring now to FIGS. 1 and 4, spur gear 82 engages an idler gear 94 attached to an idler arm 96 by means of a co-axial shaft 98 and a suitable bearing 100, the gear 82 being free to rotate about its own axis. The shaft 98 is affixed to the arm 96 by means of a set screw 102 which engages a flat surface 104 on the periphery of the shaft 98. The idler arm is pivotally mounted on the main housing 1 by means of a bolt 106 and washer 108 passing through an appropriate slot 110 which permits adjustment of the length of the arm 96.

The idler gear 94 in turn is engaged with a drive gear 112 which is co-axial with and free to rotate on a program sequence drum shaft 114 (FIGS. 1 and 2) by means of suitable radial and thrust bearings 116. Axial movement of drive gear 112 is prevented by means of thrust washer 118 and machine screw 120 affixed to drum shaft 114.

The drive gear 112 (FIGS. 1, 2 and 4) is attached to a ratchet and pawl carriage 122 by means of drive pins 123. The carriage 122 is also free to rotate about shaft 114. A pawl 124 free to pivot about a pin 126, whose axis is parallel to the axis of the drive shaft 114, is forced against a ratchet wheel 130 by a tension spring 128. The ratchet wheel is fixed to the drum shaft 114 through a key 132 or spline such that rotation of the ratchet and pawl carriage 122 in a counter-clockwise direction will cause the pawl 124 to rotate the ratchet wheel 130 thus rotating the drum shaft 114 in a counter-clockwise direction. Rotation of the ratchet and pawl carriage 122 in a clockwise direction releases the pawl's engagement in the ratchet wheel 130, thus causing no rotation of either the ratchet wheel 130 or the drum shaft 114.

The drum shaft 114 (FIG. 1) is suitably mounted to the main housing 1 by means of bearings 134 fixed in a housing 136 which in turn is fastened to the main housing by machine screws 138. A shoulder 140 on shaft 114 prevents axial movement of the shaft but permits rotation of the shaft 114 in the bearing 134.

The upper end of shaft 114 includes a co-axial surface 142 on which are mounted a series of position discs 144. The outside periphery of each disc contains a single cam surface or lobe 146 (FIG. 2) whose angular relationship is established by key-ways, and keys 148 which engage similar key-ways located in the periphery of surface 142 (FIG. 1).

The upper end 150 of shaft 114 is threaded to accommodate a retainer nut 152 and the retainer washer 154 which prevents axial movement of the position discs 144.

Figure 3:
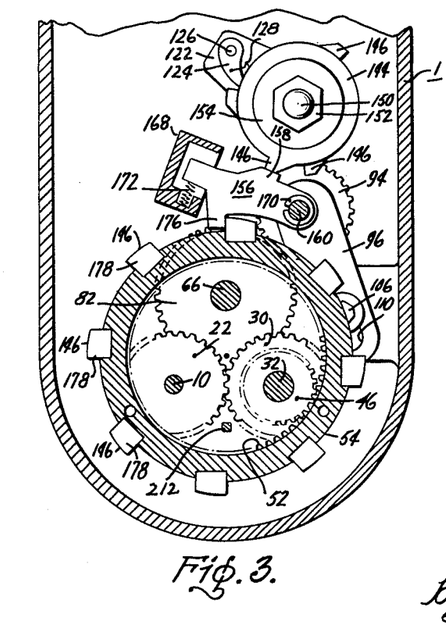
FIG. 3 is an enlarged sectional view along the line A—A of FIG. 1.

As shown in FIGS. 1, 2 and 3, each disc 144 and its cam surface 146 engages and thrusts forward one and only one stop finger 156 which has a mating cam surface 158. This action is shown in the top disc and mating stop finger on FIG. 1. Several stop fingers 156, eight in the present embodiment, are free to pivot about a vertical shaft 160 which is retained in the main housing 1 by suitable bearings 162 and 164. The vertical shaft 160 is prevented from moving axially by a shoulder 166 and suitable retaining means such as a snap ring 170 as shown in FIG. 3. FIG. 3 additionally shows a support block 168, with appropriate slots not herein shown, which provide vertical support to the outboard ends of the stop fingers 156 and contains compression springs 172, one for each stop finger 156, which cause the stop fingers 156 to be retracted against the smooth periphery of the discs 144 unless actuated by the action of the cam surface 146 against the cam surface 158.

Each stop finger 156 (FIG. 2) has a second projection 176 which, when the finger is thrust forward, engages one of eight drum stops 178 attached to the skirt of the stop drum 54 by means of machine screws 180 as shown in FIG. 2, and angularly disposed about the stop drum 54 in vertical slots 182 machined in the skirt of the stop drum 54 with a suitable spaced relationship about the drum as shown in FIG. 3. Additionally, as shown in FIG. 2, the drum stops 178 are vertically disposed in the slot 182 at levels such that no two are in the same horizontal plane, thus permitting one and only one drum stop 178 to engage an associated stop finger 156.

The relationship between the position disc 144, the finger stop 156 and the drum stop 178 is illustrated in FIG. 3 and shows that the stop drum 54 cannot rotate beyond the point where a drum stop 178 engages a related stop finger 156 as the cam surface 176 comes in intimate contact with surface 184 on the drum stop 178.

Figures 10, 11:
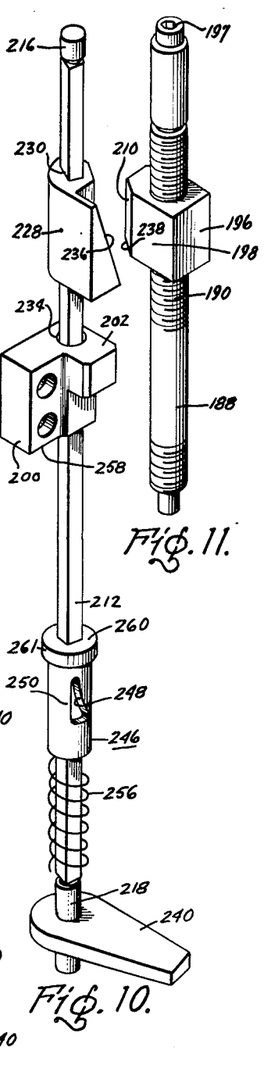
FIG. 10 is an enlarged perspective view of the switch actuator rod and associated parts.
FIG. 11 is an enlarged perspective view of the adjustable carriage stop shaft and associated parts.

FIGS. 1 and 2 illustrate the construction of the stop drum 54 which surrounds the main carriage 20. In several vertical slots 186, appropriately disposed about the periphery of the stop drum, are located an equivalent number of vertical stop adjustment shafts 188, a perspective view of one of which is shown in FIG. 11, containing threaded surfaces 190 and suitably retained at their upper ends in bored holes with suitable retaining rings 192 (FIG. 1) allowing the shafts to rotate freely about their own axes. In the present embodiment the eight (8) stop adjustment shafts 188 are further retained at their lower ends 195 by engagement in bored holes 194 (FIG. 11). Each shaft 188 additionally includes a recessed surface 197 or socket at its upper extremity which permits rotation of the shaft 188 by a suitable external device such as a wrench or screw driver. Threadedly mounted on each stop adjustment shaft 188 is an adjustable carriage stop 196 whose vertical sides 198 (FIG. 11) allow vertical sliding movement against the vertical sides of slots 186 of the drum but which prevent rotational movement of the stop about shaft 188. Thus rotation of shaft 188 by some suitable external device operating on surface 197 causes the carriage stop 196 to move vertically within the slot 186.

Permanently attached to the main carriage 20 as shown in FIGS. 1 and 10 is a single fixed carriage stop 200 of suitable design such that its upper horizontal surface 202 comes in contact with the lower horizontal surface 204 of one of the adjustable carriage stops 196, one at a time. It can thus be seen that the angular disposition of the stop drum as determined by the finger stop 156 actuated by the position disc 144 and in contact with the drum stop 178, determines which of the several adjustable carriage stops 196 will arrest further vertical movement of the main carriage 20 by engaging the fixed carriage stop 200 fixably attached to the main carriage. Rotating the stop drum 54 until its further rotation is prevented by the actuation of another of the several stop fingers 156, as actuated by another of the several position discs 144, allows another one of the several adjustable carriage stops 196 to arrest the vertical movement of the main carriage 20 by imposing the adjustable carriage stop in the vertical path of the fixed carriage stop 200. A plan view of the relationship between the fixed carriage stop 200 and the several adjustable carriage stops 196 is shown in FIG. 7.

Figure 7:
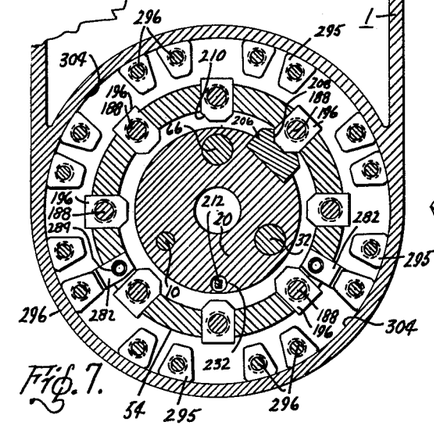
FIG. 7 is a sectional view along the line D—D of FIG. 6.

As shown in FIGS. 2 and 7, a locking cam 206 is fixed on the main carriage 20 in such a manner that an integral female wedge-shaped surface 208 will mate with the male wedge-shaped surface 210 on the adjustable carriage stops 196. It can thus be seen that the stop drum 54 is arrested from rotational movement during that portion of the vertical movement of the main carriage 20 when the locking cam 206 is engaged with one of the adjustable carriage stops 196.

Figure 9:
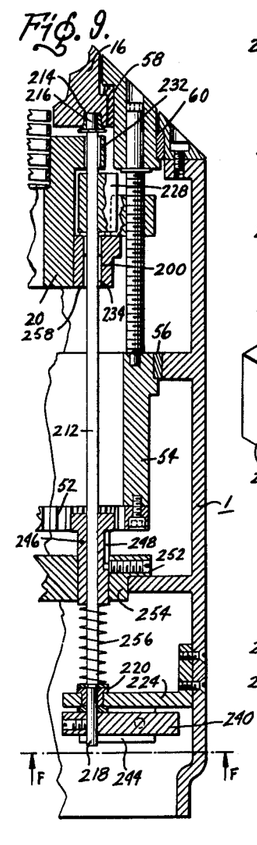
FIG. 9 is an enlarged fragmentary sectional view along the line E—E of FIG. 7.

FIGS. 9 and 10 illustrate the switch actuation rod 212 used in conjunction with the adjustable carriage stops 196. The actuation rod 212 is rectangular in cross-section through most of its length. The ends 216, 218 of the rod are cylindrical so that the rod's upper extremity 216 is suitably supported by a bearing 214 in the guide housing 16 and the rod's lower extremity 218 is supported by bearings 220 and 222 mounted in a bearing retainer bracket 224 fixed to the main housing 1 by means of machine screws 226.

Slidably mounted on the rod 212, is an actuating cam 228 containing a rectangular bore 230 and located in a recess in the main carriage 20 and the fixed stop 200 which is attached to the main carriage.

Figure 12:
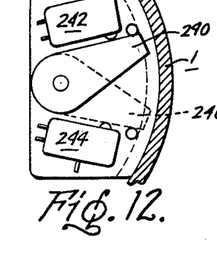
FIG. 12 is a sectional view along the line F—F of FIG. 9.

A clearance bore 232 in the main carriage and a clearance bore 234 in the fixed carriage stop, allow the actuation rod to rotate freely in its bearings 214 and 220. Vertical movement of the main carriage causes the actuating cam 228 to slide along the actuation rod 212. During the course of vertical movement of the main carriage, the wedge-shaped surface 236 on the actuation cam 228 makes contact with the corner 238 on adjustable carriage stop 196 (FIG. 11) thus causing a clockwise rotation of the switch actuation rod 212. This rotation causes the switch actuator 240 to leave contact with limit switch 242 as illustrated in FIG. 12 and to cause contact with limit switch 244. Limit switches 242 and 244, fixed on frame 1, control starting and stopping of the motor 2 through the electrical circuitry illustrated in FIG. 17.

A cylindrical shaped second actuating cam 246 is also slidably mounted on the actuation rod 212 as illustrated in FIGS. 9 and 10. This cam 246 incorporates a square bore suitably designed to allow the cam to slide on but not rotate about the rod 212. A suitably designed cam slot 248 is incorporated in the peripheral surface 250 of the cam 246 in which is engaged a cam follower pin 252 (FIG. 9) mounted in a suitable bearing block 254 fixed to the main housing 1. A compression spring 256 coiled about the rod 212 causes the cam to remain in its uppermost position unless displaced vertically by the lower horizontal surface 258 of the fixed carriage stop 200 coming in contact with the upper horizontal surface 260 on the barrel cam 246 during the course of vertical movement of the main carriage 20. The cam surface 248 in the cam 246, engaged with the cam follower 252, then causes the actuation rod 212 to rotate counter-clockwise during downward motion of the main carriage forcing the switch actuator 240 to leave contact with limit switch 242, as illustrated in FIG. 12, and to cause contact with limit switch 240.

The switch actuator 240 is held in either rotated position against the appropriate limit switch by a suitable spring mechanism not shown herein. In this manner rotation of rod 212 may be caused only by either actuation of cam 228 during the upward vertical travel of the main carriage 20 just prior to the vertical motion of the carriage being arrested by one of the adjustable carriage stops 196, or by actuation of cam 246 during the downward vertical travel of the main carriage just prior to the vertical carriage motion being arrested by the fixed carriage stop 200 coming in contact with the main housing 1 through the flange 261 on the cam 246.

Referring now to FIGS. 1 and 2, the illustrated embodiment includes a flexible member 261 fixed to the main carriage 20 in its bore 64, so that the flexible member also passes through the bore 63 in the guide housing 16. Several roller bearings 262 mounted in slots 264 in the guide housing 16 and disposed about the bore 63, allow the flexible member 261 to move slidably on the roller bearings 262 as the main carriage 20 to which the flexible member 261 is attached moves vertically. The roller bearings 262 are rotatably mounted on pins 266 carried by the guide housing 16. In the present embodiment the flexible member 261 is in the form of a pretensioned helical coil spring with the cross-section of the wire being rectangular thus permitting the external surface 268 to appear as a smooth unbroken surface.

A tendon collar 270 is fixed on the outer end of the flexible member 261 on suitable bearings not shown herein which permit the collar 270 to rotate freely about the axis of the flexible member but which do not permit axial movement of the collar with respect to the flexible member.

Figure 5:
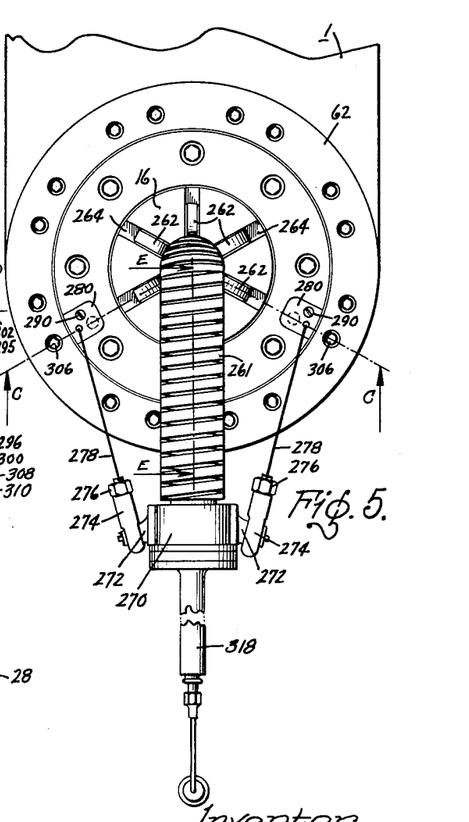
FIG. 5 is an enlarged top plan view of the embodiment shown in FIG. 1, partly broken away.

As shown in FIGS. 5 and 6, suitable spur shafts 272 extend from the collar 270 and have loosely mounted thereon universal rod end bearing members 274. Suitable means such as locking nuts 276 are provided by which flexible tension members 278 or tendons, hereafter described, are fixably attached to the rod end bearing members 274.

Figures 13, 14:
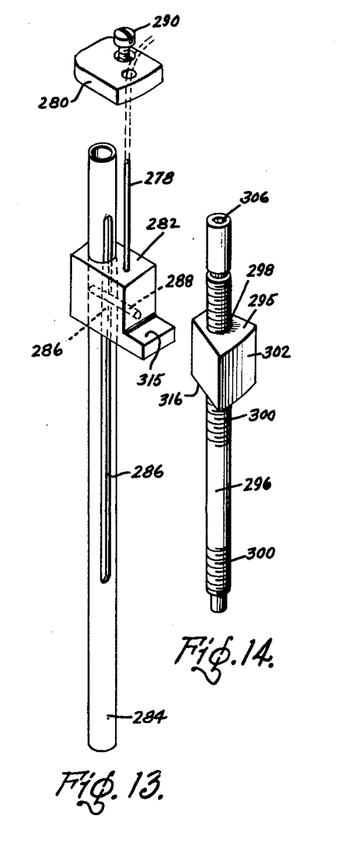
FIG. 13 is a perspective view of the tendon stop block, tendon guide and associated parts.
FIG. 14 is a perspective view of the adjustable tendon stop shaft and associated parts.

The other ends of these tension members 278, composed of wire, stranded cable, beaded chain, roller chain or similar construction, pass through openings in a guide plate 280 (FIGS. 6 and 13) and are fixed to tendon stops 282 as clearly illustrated in FIG. 13.

The tendon stop 282 is slidably mounted on a cylindrical, tendon stop guide rod 284 having a vertical guide slot 286. A horizontal pin 288 is fixed in the tendon stop 280 so that it passes through the guide slot 286, permitting sliding motion of the tendon stop 282 on the guide rod 284 but preventing rotary motion of the tendon stop about the guide rod 284.

FIGS. 2 and 6 show the location of the tendon stop guide rods 284 as assembled with the stop drum 54 at two locations on the drum periphery. A plan view of this location is shown in FIG. 7. Referring again to FIG. 6, the upper end of each guide rod is located in a vertical bore 286 and restrained from axial movement by the guide plate 280 seated in a counter-bored hole 288 co-axial to bore 286 and fixed to the stop drum 54 by means such as a machine screw 290 illustrated in FIG. 13.

The lower end of each guide rod 284 (FIG. 6) is retained in a vertical bore 292 co-axial with bore 286 but located in the lower skirt of the stop drum 54, thus holding the guide rod parallel to but not coincident with the axes of shaft 32, 66, 10 and 188. A tension spring 294 suitably attached to the tendon stop 282 and the stop drum 54 at the bottom of bore 292, restrains the vertical displacement of the tendon stop 282 as it moves slidably on the tendon stop guide rod 284.

FIG. 14 illustrates one of several identical adjustable tendon stops 295 and one of several tendon stop adjustment shafts 296. The adjustable tendon stop 295 has a bored and threaded hole 298 which mates with a threaded surface 300 on shaft 296.

As shown in FIGS. 7 and 14, the surface 302 of each stop 295 is curved to conform with the inside surface 304 of the main housing 1 and is in intimate slidable contact with this latter surface at all vertical positions of the tendon stop 295. This intimate slidable contact prevents rotation of tendon stop 295 about the shaft 296 thus permitting the stop 294 to be moved vertically by rotating shaft 296 through some suitable external device such as a screw-driver or wrench acting in an end socket, recess or the like 306 (FIG. 14).

FIGS. 2, 6 and 7 illustrate the location of the several tendon stop adjustment shafts 296 sixteen (16) of which are used in this embodiment, mounted in the main housing so that their axes are held parallel to the axes of the tendon guide rods 284 but not coincident with them. The lower end of the shaft 296 is retained in a bore 308 in a horizontal flange 310 about the inside periphery of the front end of the main housing 1. The upper end of each shaft 296 is suitably retained in a bore 312 co-axial with bore 308 but located in a horizontal flange 314 about the periphery of the upper surface of the main housing 1. These shaft ends are accessible through openings in the top of the tendon adjustment ring 62.

It can thus be seen that slidable vertical displacement of each tendon stop 282 is limited by intimate contact between the upper horizontal surface 314 on the tendon stop 282 as shown in FIG. 13 and the lower horizontal surface 316 on one of the several adjustable tendon stops 295 as shown in FIG. 14 and also in FIG. 6. As shown in FIG. 7 the angular disposition of stop drum 54, as determined by the finger stop 156 which has been actuated to restrain the rotation of stop drum 54, determines which two (2) of the several adjustable tendon stops 295 will arrest further vertical movement of the two tendon stops 282.

One of a plurality of gripping means 318, adapted to the particular articles to be handled, is shown in FIGS. 1, 2 and 5 attached to the tendon collar 270 on the end of the flexible member 260. Other gripping means not herein shown are removably attachable to the tendon collar by similar means such means as machine screws 320 shown in FIG. 2.

For the particular gripping means 318 a flexible hose 322 as shown in FIG. 1 led up through the center of flexible member 260 and attached to the gripping means by mechanisms not herein shown, to provide a vacuum. Other manipulating hands, tools or the like are actuated by flexible hose, shaft, electric cable or the like as required, similarly led to the hand or tool.

Figure 15:
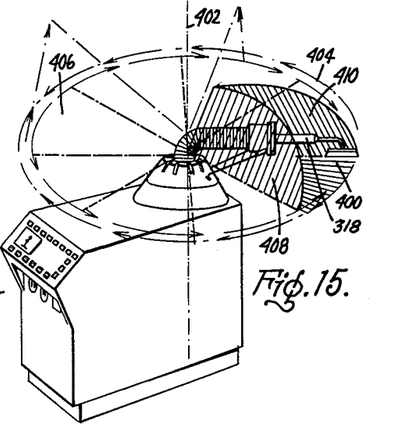
FIG. 15 is a perspective view of the embodiment of the invention showing its range of access to points in space.

FIG. 15 illustrates the control panel and includes means such as a power-on, power-off switch 324, an automatic or manual mode switch 326, a momentary motor jog-up switch 328, a jog-down switch 330 for manual mode operation, a grip-on, grip-off switch 332 for manual mode operation, a home switch 334, a time delay relay 336 and several selector switches 338 to program the gripping means during automatic mode operation. Several selector switches 340 also determine operation of the gripping means during automatic mode operation, as shown in the electric circuit.

Figure 17:
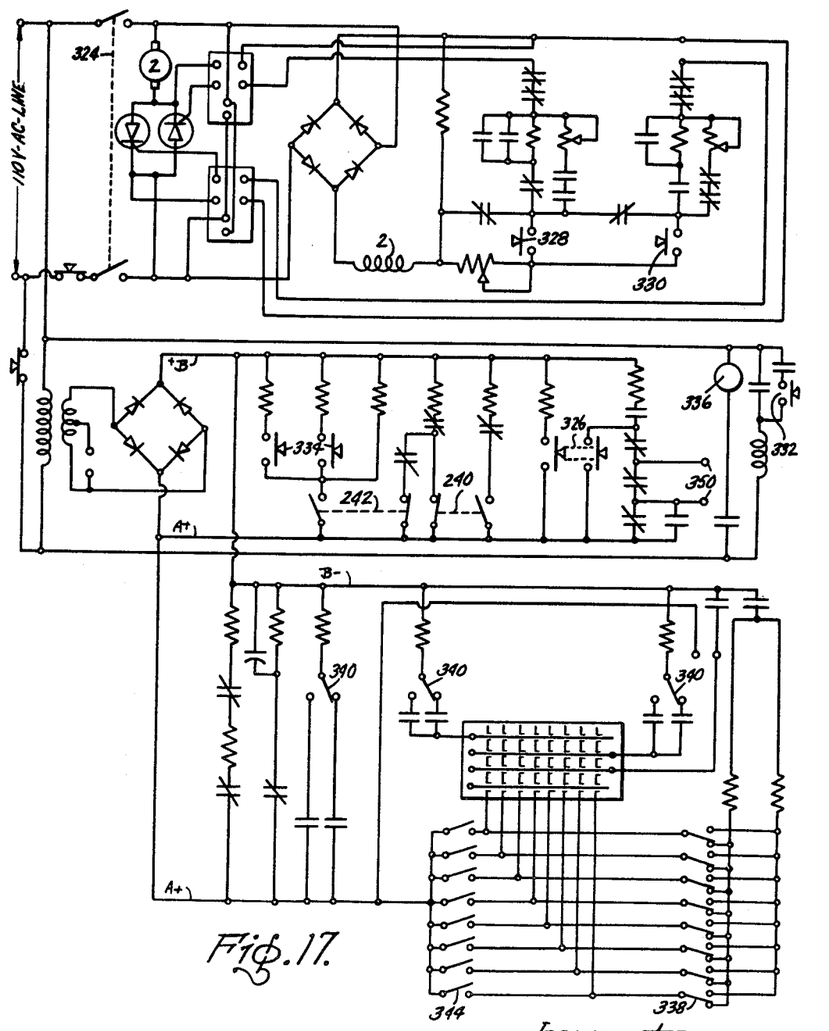
FIG. 17 is a diagram of the electrical circuitry of the machine including the associated electrical components.

FIG. 17 is an electrical circuit, schematically showing the components employed to operate the present embodiment. The various components are mounted in the main housing 1 on a circuit panel 342 shown in FIG. 1. The limit switches 342, 344, eight (8) in the present embodiment, are physically mounted in a manner illustrated in FIG. 2. The switches are so mounted in retainer block 168 such that one and only one will be actuated by a related stop finger 156 as the latter is displaced by the lobe 146 on one of several discs 144, thus electrically defining the angular position in which stop drum 54 has been arrested.

In operation, assuming it is required to position the gripping means 318 in a specific elevation and lateral attitude in space, connection is made to an operating source of power as for example, a 110 v. A.C. 60 cycle electrical source, shown schematically in FIG. 17. The power source for actuation of the hand 318 may be, as previously indicated, a vacuum source attached to the gripping means 318 by a suitable flexible hose, or it may be a source of other suitable power, for operating suitable hand or manipulating means such as motors, cylinders, solenoids, relays, electromagnets, switches and the like in place of the means 318.

As can be seen from FIGS. 3 and 15, each of the drum stops 178 determines a radial position for the stop drum 54 such that an imaginary vertical plane passed through its axis of rotation 402 and the switch actuation rod 212 will contain the center line of a sector of a horizontal circle 404, FIG. 15, about the center line of rotation 402 with the circle being divided up into as many pie-shaped sectors 406 as there are drum stops 178. If two imaginary vertical planes were erected such that each passes through the center line of rotation 402 and one of the radial lines representing the edges of the pie-shaped sector 406, the space enclosed by these planes represents a volume of space hereinafter referred to as a space sector, as for example space sector 400 shown in FIG. 15 enclosed by the shaded imaginary planes 408 and 410.

A judgment is made as to which of the sectors, as for example, sector 400, shown shaded in FIG. 15, includes the elevation and position desired. The next step is to place a position disc 144 on cylindrical surface 142 on sequence drum shaft 114, so that the next rotation of the drum shaft caused by the ratchet and pawl carriage 122 and related mechanisms will cause the cam 146 to interpose the stop finger 156 related to the sector, thus arresting the rotation of the stop drum 54 in the desired sector. The next step is to actuate the manual mode switch 326, then one of the momentary motor control switches 330 which will cause the motor 2 to rotate the ball lead screw shaft 10 in such a manner as to move the main carriage 20 downward until it has reached the bottom of its travel. During the course of vertical movement of the carriage 20, the cam follower 88 has caused shaft 66 to rotate as described previously, thus causing the drum shaft 114 to rotate and thrusting the desired stop finger 156 forward where it will be in position to arrest the counter-clockwise rotation of the stop drum 54.

The second momentary motor control switch 328 is now operated, through suitable relay means, schematically indicated in FIG. 17, to cause motor 2 to rotate the ball lead screw shaft 10 in the direction to move main carriage 20 vertically upward. In addition to moving the carriage 20 upward, the rotation of shaft 10 is also transmitted, as described above, to rotate shaft 32 through the action of the rotor 42 and the main housing 50 of the one-way clutch and thus rotate the planetary gear 46 and the internal ring gear 52, to cause stop drum 54 to rotate in a counter-clockwise direction until its rotation is arrested by the previously actuated stop finger 156. Thus the stop drum 54 is now positioned to face the sector desired. Since drum 54 is mechanically prevented from further rotation, the slip clutch mechanism 34 allows gear 30 to rotate idly about shaft 32 but continues to force the engaged drum stop 178 against the previously actuated stop finger 156.

The next step is to adjust the vertical position at the two adjustable tendon stops 294 related to the selected sector. This adjustment is performed by rotating each shaft 296 with a suitable external device, as previously described, thus vertically displacing the adjustable tendon stops 294. These stops 294 will arrest the vertical movement of the tendon stops 282 and cause the flexible member 261 to deflect downwardly as a result of the action of tendon members 278 as the momentary motor control switch 328 is intermittently operated to cause the main carriage 20 to move intermittently upward. By intermittently adjusting the tendon stops 294 together and also relative to one another they, conjointly with the up-movement of the flexible member 261, are operated to bring the gripping means 318 to the desired elevation and position. This adjusting of the tendon stops 294 varies the effective length of both the tension members or tendons 278 and varies their lengths relative to one another to allow for lateral positioning of the gripping means 318 within the selected sector. Such adjustment of the effective lengths of the tendons 278 and the elevation of the carriage 20 serves to position the flexible member 260 as desired.

The carriage 20 is secured in this position by stop means adjusted by rotating shaft 188 with a suitable external device as previously described, thus vertically locating the adjustable carriage stop 196, for the selected sector, against the fixed carriage stop 200, and securing the vertical position of the carriage. The gripping means 318 can now be operated by depressing switch 332 which, through suitable relay means shown schematically in FIG. 17, permits the power means employed to actuate the gripping means.

An additional step may be required involving a decision whether the gripping means 318, during the automatic operation of the unit, will be required to pick up, or to release an object at this point in the operation. The selector switch 338 for the desired sector is then operated and by its design, maintained in that operated position to cause actuation of the gripping means in the desired manner during automatic mode of operation, through relay means schematically indicated in FIG. 17. Other desired locations in other space sectors 400 at which the gripping means 318 is required to operate sequentially are established by similar procedure in order to perform the desired materials handling task.

Assuming that all the desired points in space have been determined as previously described, the mode selector switch 326 may be operated to select automatic mode operation and the power switch 324 operated to provide power to the circuitry schematically illustrated in FIG. 17. The parts then automatically proceed to repeat in the selected succession, for each selected point, the operations determined by the manual procedure above. This automatic operation proceeds as follows. The motor 2 causes the main carriage 20 to move vertically downward to its lowermost position. The vertical travel of the carriage causes the sequence drum shaft 114 to rotate through the action of shaft 80, pawl carriage 122 and related mechanisms previously described. This action causes the stop finger 156 related to the next desired sector to be thrust forward by a cam disc 144 set in the manual procedure above. In addition, this vertical downward travel of the main carriage 20 causes rotation of the switch actuation rod 212 through mechanisms previously described, thus slowing down the speed of motor 2 and reversing the rotation of the motor through operation of the limit switches 242 and 244 and related relay means schematically illustrated in FIG. 17.

Reversal of rotation of motor 2 causes main carriage 20 to move vertically upward through the gearing and lead screw 10 previously described. In addition, the other gearing and mechanisms on shaft 32 cause stop drum 54 to rotate until that rotation is arrested by interaction between the drum stop 178 and the stop finger 156 just previously thrust forward. The main carriage 20 continues vertically upward, carrying with it the flexible member 260, its related tension members 278 and their tendon stops 282 moving slidably on guide rods 284, as well as related mechanisms previously described. At some point in this vertical travel, the vertical sliding movement of the tendon stops 282 is arrested by contact with the adjustable tendon stops 294, related to the sector involved, and previously set in the manual procedure above.

As the main carriage 20 continues vertically upward, the flexible member 260 carrying the gripping means 318 is laterally deflected by action of the now arrested tension members 278. The main carriage 20 continues its upward travel until the adjustable stop 196 related to the sector and previously set in the manual procedure above, causes rotation of the switch actuation rod 212 through cam means 228 and related mechanism previously described. This action operates limit switches 242 and 244 and through suitable relay means schematically illustrated in FIG. 17, causes motor 2 to slow and finally stop just as the movement of main carriage 20 is arrested by contact between the fixed carriage stop 200 and the adjustable carriage stop 196. The gripping means 318 is now at one of the desired points in space.

The gripping means 318, after a brief instant of time established by suitable electrical circuitry illustrated in FIG. 17, is operated as desired and as established by the position of selector switch 338 for the sector involved as a result of the manual procedure above.

The parts will then proceed with the operation arranged for the next succeeding sector unless delayed by electrical means existing in the control circuit illustrated in FIG. 17. Representative of these electrical means is a time delay relay 336 or a signal generating device such as a limit switch attached to a related machine involved in the material handling task and connected to the subject machine via an electric cable 350. Once the aforementioned electrical means have operated, the motor 2 will be operated in such a manner as to cause carriage 20 to move vertically downward, thus allowing the parts to operate in a manner similar to the description above and carrying the gripping means 318 to the next sequential spacial location required in the material handling task.

The electrical circuitry may be as shown schematically in FIG. 17, comprising elements conventionally represented and well understood in the art.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and scope of the appended claims.

I claim:

1. An object-manipulating mechanism comprising a housing, a flexible arm movably mounted within said housing, said arm having object-engaging means mounted at one end thereof, means for reciprocally moving said arm in said housing to linearly extend and retract said one end of said arm, means for determining the extent of such movement, flexible tension means connecting said housing and said one end of said arm, means for determining the length of said tension means, both of said means for determining the extent of movement and the length of said tension means cooperating on extension of said arm to laterally displace said one end of said arm, thereby to predeterminedly position said object-engaging means in space.

2. An object-manipulating mechanism comprising a housing, a flexible arm, said arm mounted within said housing for axial movement thereto, said arm having an end extending outwardly of said housing, object-engaging means mounted on the extended end of said arm, means for moving said arm to axially extend or retract said arm relative to said housing, means for selectively determining the extent of said axial movement, flexible tension means connecting the extended end of said arm and said housing, said tension means being movably secured with respect to said arm and said housing so as to move in an arcuate path about the longitudinal axis of said arm, means for selectively moving said tension means in said arcuate path, means for selectively determining the length of said tension means whereby by cooperation of said means for determining the extent of movement of said arm and said tension means and the means for determining said movement of said arm and the length of said tension means, said object-engaging means may be predeterminedly positioned in space.

3. The mechanism according to claim 2 wherein the flexible arm comprises a pretensioned helical coil spring.

4. The mechanism according to claim 3 wherein the flexible tension means comprises a pair of spaced elongated wire tendoms.

5. An object-manipulating mechanism comprising a housing, a carriage mounted for axial movement within said housing, a drum located between said carriage and said housing, said drum being mounted to rotate about said carriage within said housing, a flexible arm having one end mounted within said carriage and the other end extending outwardly of said housing, object-engaging means mounted on the extended end of said arm, means for moving said carriage to extend or retract said arm relative to said housing, means for selectively determining the extent of movement of said carriage, means for rotating said drum, means for selectively determining the extent of rotation of said drum, flexible tension means connecting the extended end of said arm and said drum, said tension means being secured to said arm so as to be movable about said arm on rotation of said drum, and means for selectively determining the length of said tension means whereby said arm may be caused to be laterally displaced upon extension from said housing to position said object-engaging means at a predetermined point in space.

6. The mechanism according to claim 5 including means mounted on the extended end of the flexible arm for interchangeably mounting thereon a plurality of varying object-engaging means.

7. The mechanism according to claim 5 including a motor unit and means operably interconnecting said motor unit and the several means for moving said arm and said drum for cooperative operation.

8. The mechanism according to claim 7 including means for automatically and continuously repeating the operation of said mechanism.

9. An object-manipulating mechanism comprising a housing, a carriage mounted for axial movement within said housing, a drum located between said housing and said carriage, said drum being mounted to rotate about said carriage within said housing, a flexible arm having one end mounted within said carriage for movement therewith and the other end extending outwardly of said housing, object-engaging means mounted on the extended end of said arm, means for moving said carriage to extend or retract said arm relative to said housing, means for rotating said drum, said carriage and said drum being provided with relatively adjustable cooperating stop means to selectively limit the axial movement of said carriage, said drum and said housing being also provided with relatively adjustable cooperating stop means to selectively limit the rotative movement of said drum, flexible tension means connecting the extended end of said arm and said drum, said tension means being attached to said arm so as to be movable about said arm on rotation of said drum, said tension means being secured to said drum so as to move with respect thereto upon axial movement of said arm, said tension means and housing being provided with relatively adjustable cooperating stop means to selectively determine the length of said tension means, whereby upon conjoint operation of the part of said mechanism said arm may be caused to be laterally displaced so as to predeterminedly position in space said object-engaging means.

10. The mechanism according to claim 9 wherein the housing is provided with an end cap through which the flexible arm extends and which provides fulcrum means for the lateral displacement of the extended end of said arm.

11. The mechanism according to claim 10 wherein the flexible arm comprises a pretensioned helical coil spring in which the wire has a rectangular cross section.

12. The mechanism according to claim 9 wherein the tension means comprise a pair of wire tendons and the means for securing said tension means to the extended end of the arm and a rotatable collar movably secured to the end of said arm, said tendons means being located thereon in substantially diametrically opposed positions.

References Cited in the file of this patent
UNITED STATES PATENTS

| | | |
|---|---|---|
| 2,595,134 | Gordon | Apr. 29, 1952 |
| 2,861,701 | Bergsland et al. | Nov. 25, 1958 |
| 3,047,236 | Fahrner | July 31, 1962 |

FOREIGN PATENTS

| | | |
|---|---|---|
| 1,180,090 | France | Dec. 29, 1958 |